US009474004B2

(12) United States Patent
Shitara

(10) Patent No.: US 9,474,004 B2
(45) Date of Patent: Oct. 18, 2016

(54) MOBILE DEVICE AND INFORMATION PROCESSING SYSTEM

(71) Applicant: Oki Data Corporation, Tokyo (JP)

(72) Inventor: Ryou Shitara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 23 days.

(21) Appl. No.: 14/033,715

(22) Filed: Sep. 23, 2013

(65) Prior Publication Data

US 2014/0087730 A1 Mar. 27, 2014

(30) Foreign Application Priority Data

Sep. 27, 2012 (JP) ................................ 2012-213827

(51) Int. Cl.
*H04W 36/28* (2009.01)
*H04W 48/18* (2009.01)
*H04W 36/24* (2009.01)

(52) U.S. Cl.
CPC ............. *H04W 36/28* (2013.01); *H04W 48/18* (2013.01); *H04W 36/24* (2013.01)

(58) Field of Classification Search
CPC ... H04W 36/24; H04W 36/28; H04W 48/18; H04W 88/02; H04W 88/06; H04W 4/02; H04W 48/16; H04W 48/20; H04W 48/00; H04W 48/08; H04W 48/07; H04W 48/04; H04W 48/06; H04W 88/00; H04W 88/08; H04W 88/18; H04W 36/34; H04W 36/36; H04W 28/00
USPC ................................................. 455/436, 435
See application file for complete search history.

(56) References Cited

U.S. PATENT DOCUMENTS

| 6,886,028 | B1* | 4/2005 | Matsuyama | G06F 3/1207 358/1.15 |
|---|---|---|---|---|
| 8,406,748 | B2* | 3/2013 | Raleigh et al. | 455/414.1 |
| 8,589,541 | B2* | 11/2013 | Raleigh et al. | 709/224 |
| 2001/0038625 | A1* | 11/2001 | Satoh | H04M 15/10 370/352 |
| 2004/0071086 | A1* | 4/2004 | Haumont et al. | 370/230 |
| 2004/0147223 | A1* | 7/2004 | Cho | 455/41.2 |
| 2007/0167174 | A1* | 7/2007 | Halcrow et al. | 455/456.2 |
| 2010/0222032 | A1* | 9/2010 | Griffin et al. | 455/414.1 |
| 2010/0262682 | A1* | 10/2010 | Dunn et al. | 709/221 |
| 2010/0285827 | A1* | 11/2010 | Kim et al. | 455/517 |
| 2012/0089845 | A1* | 4/2012 | Raleigh | 713/176 |
| 2012/0155296 | A1* | 6/2012 | Kashanian | 370/252 |
| 2012/0236358 | A1* | 9/2012 | Huang | 358/1.15 |
| 2013/0308470 | A1* | 11/2013 | Bevan et al. | 370/252 |

FOREIGN PATENT DOCUMENTS

JP 2009-075807 A 4/2009

* cited by examiner

*Primary Examiner* — Meless Zewdu
*Assistant Examiner* — Jean Chang
(74) *Attorney, Agent, or Firm* — Muncy, Geissler, Olds & Lowe, P.C.

(57) ABSTRACT

A mobile device includes a wireless communicating unit, an input unit, and a communication control module. The wireless communicating unit is configured to communicate via a plurality of kinds of wireless networks. The input unit is configured to receive an order for ranking and prioritizing one or more communicative conditions. The communication control module is configured to select a first wireless network from a plurality of available wireless network based on a the prioritization and ranking that is a result of ranking the communicative conditions, and to control the wireless communicating unit so as to transmit data via the first wireless network.

25 Claims, 17 Drawing Sheets

FIG. 4

```
┌─────────────────────────────────────────┐
│ COMMUNICATIVE CONDITION                 │
├─────────────────────────────────────────┤
│                                         │
│   PLEASE DESIGNATE THE COMMUNICATIVE    │
│   CONDITION THAT IS PLACED HIGH VALUE ON.│
│                                         │
│         ╭─────────────────────╮         │
│         │  TRANSMISSION SPEED │         │
│         ╰─────────────────────╯         │
│                                         │
│         ╭─────────────────────╮         │
│         │ COMMUNICATION CHARGE│         │
│         ╰─────────────────────╯         │
│                                         │
│         ╭─────────────────────╮         │
│         │      SECURITY       │         │
│         ╰─────────────────────╯         │
│                                         │
└─────────────────────────────────────────┘
```

FIG. 15

```
┌─────────────────────────────────────────────┐
│ REQUEST                                     │
├─────────────────────────────────────────────┤
│ THE IMAGE MAY BE FORMED?                    │
│ TO SEND DATA, THE COST IS ABOUT             │
│ $8 (1MByte).                                │
│ THE RESTRICTIVE CONDITION (TRANSMISSION     │
│ SPEED) IS NOT OCCURED DUE TO                │
│ THE ACCUMULATIVE COMMUNICATION VOLUME.      │
│                                             │
│ ACCUMULATIVE COMMUNICATION    1150 Mbyte    │
│ VOLUME:                                     │
│                                             │
│ ACCUMULATIVE COMMUNICATION    1151 Mbyte    │
│ VOLUME AFTER THIS SENDING:                  │
│                                             │
│ TRANSMISSION CEILING:         70000 Mbyte   │
│                                             │
│         [  YES  ]       [  NO  ]            │
└─────────────────────────────────────────────┘
```

ML DEVICE AND INFORMATION PROCESSING SYSTEM

CROSS-REFERENCE TO RELATED APPLICATION

This application claims priority under 35 U.S.C. §119 from Japanese Patent Application No. P 2012-213827, filed on Sep. 27, 2012, the disclosure of which is incorporated herein by reference.

BACKGROUND

1. Technical Field

This application relates to a mobile device and an information processing system.

2. Description of Related Art Japanese patent publication 2009-75807 describes a mobile device sends characters to an information processing device via network, and the information processing device receives and prints the characters.

However, the mobile device cannot select a wireless network from among some kinds of wireless networks according to communicative conditions that place a high value on when the mobile device communicates.

SUMMARY

In view of the above, a mobile device is disclosed that is capable of selecting a wireless network according to a priority ranking and of improving user convenience.

In particular, a mobile device includes a wireless communicating unit, an input unit, and a communication control module. The wireless communicating unit may be configured to communicate via a plurality of kinds of wireless networks. The input unit may be configured to receive an order ranking and prioritizing one or more communicative conditions. The communication control module may be configured to select a first wireless network from a plurality of available wireless networks based on a priority ranking that is a result of the ranking and prioritizing of the one or more communicative conditions, and to control the wireless communicating unit so as to transmit data via the first wireless network.

In this way, the mobile device may select the wireless network according to the priority ranking appropriately, and transmit via the wireless network that is selected.

BRIEF DESCRIPTION OF THE DRAWINGS

FIG. 4 illustrates a selection screen for communicative conditions;

FIG. 15 illustrates a request screen requesting image forming;

DETAILED DESCRIPTION

Figure 1:
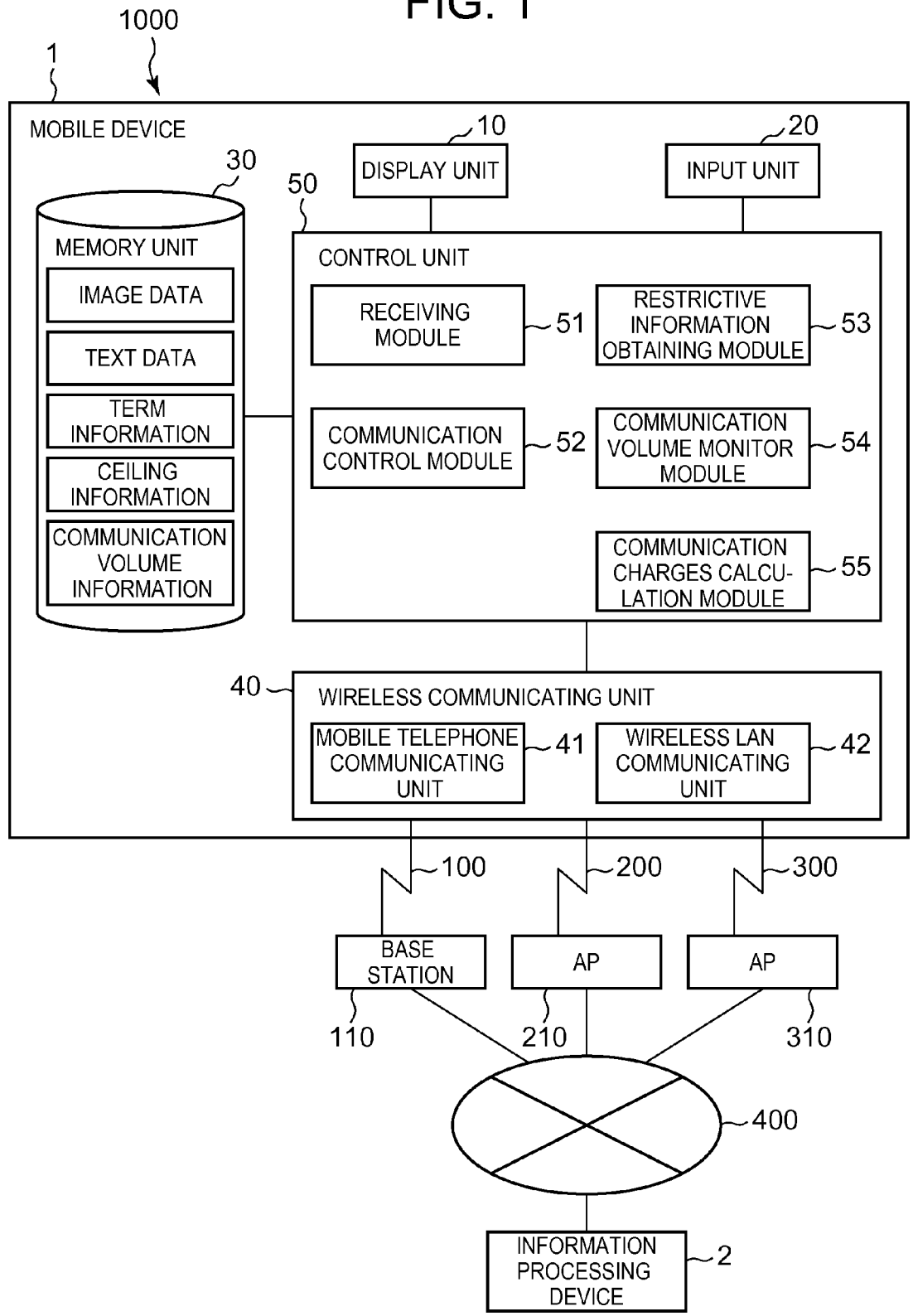
FIG. 1 is a schematic block diagram showing the composition of an information processing system according to a first illustrative embodiment.

Embodiments of the information processing system will be described with reference to FIGS. 1 to 22 of the drawings, in which like elements are indicated by like reference characters. In the drawings, configurations, positional relations, dimensions, and alignments of elements of the device are illustrated generally for understanding the embodiments and are only intended to facilitate understanding. Described numerical values are merely exemplary. In the drawings, common elements of structures may be designated by the same reference characters, and an explanation thereof is occasionally omitted. Accordingly, embodiments are in no way limited to those illustrated.

Configuration of the Information Processing System in the First Illustrative Embodiment The configuration of a first illustrative embodiment of the information processing system is shown FIG. 1. The information processing system 1000 in FIG. 1 may include one or more mobile device(s) 1 and one or more information processing device(s) 3.

The mobile device 1 is a device that may communicate via wireless networks, for example, a cell phone, a smart phone, and a PC (Personal Computer). The mobile device 1 sends data, for example, image data, to the information processing device 2 via one of the wireless networks.

As shown in FIG. 1, the mobile device 1 may communicate via a mobile telephone network 100, a public wireless LAN (Local Area Network) 200, or a personal wireless LAN 300. The mobile telephone network 100, the public wireless LAN 200, and the personal wireless LAN 300 may connect to the Internet 400, and the mobile device 1 may communicate to the information processing device 2 via the Internet 400. The base station 110 may connect the mobile telephone network 100 and the Internet 400, consequently the mobile device 1 may communicate via the mobile telephone network 100 and the Internet 400. The Access Point (AP) 210 may connect the public wireless LAN 200 and the Internet 400, therefore the mobile device 1 may communicate via the public wireless LAN 200 and the Internet 400. The AP 310 may connect the personal wireless LAN 300 and the Internet 400, consequently the mobile device 1 may communicate via the personal wireless LAN 300 and the Internet 400.

The information processing device 2 may receive and process data, for example, image data from the mobile device 1 via the Internet 400.

The mobile device 1 may include a display unit 10, an input unit 20, a memory unit 30, a wireless communicating unit 40, and a control unit 50.

The display unit 10 may display operating information and transmit status, for example, the display unit 10 may include a liquid crystal panel. The input unit 20 may be a user interface to take instruction(s) from user, for example, an operating panel that takes instruction(s) on the manipulation of the mobile device 1. Together, the display unit 10 and the input unit 20 may, for example, comprise a touch screen.

The memory unit 30 may store data, for example, sending data, controlling data, working data. As shown in FIG. 1, the memory unit 30 may store the image data, the text data, the term information, the ceiling information, and the communication volume information. The term information, the ceiling information, and the communication volume information are used for controlling the mobile device 1. The image data and the text data may be included in image forming data, and both of them are stored in the memory unit 30. The memory unit 30 may be configured using a hard disk (HDD), a Read Only Memory (ROM), a Random Access Memory (RAM) or an Erasable Programmable Read Only Memory (EEPROM). In other words, any of the operations or functions discussed herein may be implemented on Non-Transitory Computer-Readable Media.

The wireless communicating unit 40 may be a wireless communication interface that communicates via wireless networks. As shown in FIG. 1, the wireless communicating unit 40 may include a mobile telephone communicating unit 41 and a wireless LAN communicating unit 42. The mobile telephone communicating unit 41 may communicate via the mobile telephone network 100, and the wireless LAN communicating unit 42 may communicate via the public wireless LAN 200 and/or the personal wireless LAN 300.

The control unit 50 may control each of elements included in the mobile device 1. The control unit 50 may execute control programs that are stored in the memory unit 30. The control unit 50 may also oversee functions of the mobile device 1.

Other implementations are possible in the mobile device 1, such as pure hardware implementations (e.g., specialized or application specific integrated circuits configured with logic to perform particular operations), or combinations of hardware and software and/or firmware.

The control unit 50 may include a receiving module 51, a communication control module 52, a restrictive information obtaining module 53, a communication volume monitor module 54, and a communication charges calculation module 55.

The receiving module 51 may receive order(s) for the control unit 50. The receiving module 51 may make the display unit 10 display a screen for order(s) from user, and receive the order(s) via the input unit 20. The receiving module 51 may send the order(s) to the communication control module 52.

The receiving module 51 may receive an order for ranking communicative condition(s) in terms of priority. The communicative conditions may be at least one of transmission speed, communication charges, and security. Specifically, the receiving module 51 may receive the order designating a first priority ranking that has the highest value from among the communicative condition(s).

The receiving module 51 may receive order(s) for forming an image that is designated data by the user. In this embodiment, when the receiving module 51 receives the order(s) for forming the image, the receiving module 51 receives the order for ranking the communicative condition(s) by their priority, and sends the order(s) for forming the image and the ranking communicative condition(s) to the communication control module 52.

The communication control module 52 may select a network from among the networks 100, 200, and 300 according to the priority ranking of the communicative conditions, and may control the wireless communicating unit 40 to send image forming data via the selected network. The communication control module 52 may make the mobile telephone communicating unit 41 send the image forming data when the communication control module 52 selects the mobile telephone network 100. The communication control module 52 may make the wireless LAN communicating unit 42 send the image forming data when the communication control module 52 selects the public wireless LAN 200 and/or the personal wireless LAN 300.

The communication control module 52 may refer to a correspondence table that indicates the communicative condition(s) corresponding to the networks 100, 200, and 300, and, as result of referring, the communication control module 52 may select a network. The communicative conditions(s) may correspond the networks that work under the communicative condition(s). The communication control module 52 may obtain the correspondence table from a user or a server that may be connected to the Internet 400. The correspondence table may be stored in the memory unit 30.

The restrictive information obtaining module 53 may obtain restrictive information that indicates restrictive condition(s) of the transmission speed if the networks 100, 200, and 300 are restricted in their transmission speed. For example, the restrictive information obtaining module 53 may obtain and store the restrictive information from server(s) via the Internet 400. The restrictive information may be stored in memory unit 30. If accumulative communication volumes are greater than a predetermined transmission ceiling in networks 100, 200, and 300, the restrictive condition(s) of transmission speed may occur. The restrictive information obtaining module 53 may store the term information and the ceiling information in the memory unit 30. The term information may indicate that the term is, for example, three days or thirty days.

Figure 2:
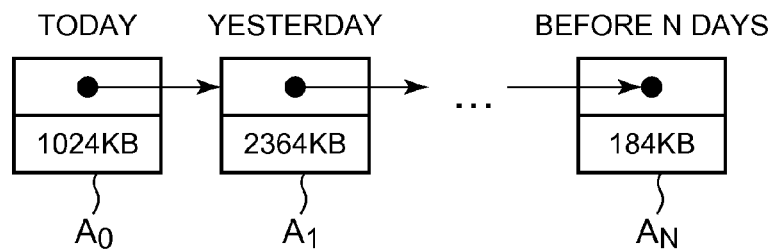
FIG. 2 illustrates a communications traffic that varies day-by-day.

The communication volume monitor module 54 may monitor or measure the network(s) in which the restrictive condition(s) of transmission speed occur. The communication volume monitor module 54 may store a result of the monitoring and measuring as communication volume information in the memory unit 30. The communication volume may indicate data volume that is sent and received by the mobile device 1 via the network 100, 200, or 300. The data may include the image forming data, e-mail data, and web data. The communication volume information is used for deciding whether the networks 100, 200, and 300 are network(s) in which the restrictive condition(s) of transmission speed occur. The communication volume information may specify cumulative communication volumes during a predetermined term. The cumulative communication volumes may indicate communication volume that is accumulated each day during the days of the term information. As shown in FIG. 2, the communication volume information has a data structure. The data structure may include a communication volume ($A_0$ to $A_N$) on each day. Today's communication volume may be stored in the first communication volume $A_0$, yesterday's communication volume may be stored in the next volume $A_1$, and the previous $N^{th}$ day's communication volume may be stored in the $N^{th}$ volume $A_N$.

The communication charges calculation module 55 may calculate communication charges based on the communication volumes when data is transmitted via a charged network. The communication control module 52 may obtain the communication charges from the communication charges calculation module 55.

The communication control module 52 may include the functions described below.

(A1) The communication control module 52 may select a network that is to be communicated with based on whether there are any the network(s) in which the restrictive condition(s) of transmission speed have occurred. Thus, the communication control module 52 may determine whether there are any the network(s) in which the restrictive condition(s) of transmission speed have occurred based on the restrictive information and the result of the monitoring. Specifically, the communication control module 52 may calculate the cumulative communication volumes in the latest predetermined period based on the term information, the ceiling information, and the communication volumes information, and may compare the cumulative communication volumes with the transmission ceiling. If the cumulative communication volumes are less than the transmission ceiling, the communication control module 52 may decide that the restrictive condition(s) of transmission speed have not occurred. If the cumulative communication volumes are greater than the transmission ceiling, the communication control module 52 may decide that the restrictive condition(s) of transmission speed have occurred.

(A2) When the network is selected based on the priority ranking(s), the communication control module 52 may check whether the restrictive condition(s) of transmission speed have occurred in the selected network. When the restrictive condition(s) of transmission speed have occurred, sending data may be transmitted via the selected network. When the restrictive condition(s) of transmission speed have not occurred, sending data may be transmitted via the selected network if the communication control module 52 receives an acknowledgement by the user regarding the communication via the network that the communication control module 52 selects. The communication control module 52 may make the display unit 10 display the restrictive information. The restrictive information may include message(s) that indicate that the restrictive condition(s) of transmission speed have occurred in the selected network, the ceiling information, the cumulative communication volumes at present, and communication volume that is needed to transmit the image forming data. The communication control module 52 may cancel sending the image forming data or may select another network as a result of receiving a denial by the user or by the priority ranking.

(A3) When network is selected based on the priority ranking(s), the communication control module 52 may check whether the restrictive condition(s) of transmission speed have occurred in the selected network. When the restrictive condition(s) of transmission speed have occurred, the chosen network is changed to another network as a result of receiving a reply from the user to change the chosen network. The communication control module 52 may select another network based on the priority ranking(s) or the order by the user. The communication control module 52 may receive the order for a change of the selected network before or after the transmission of the selected network starts.

(A4) When network is selected based on the priority ranking(s), the communication control module 52 may check whether the restrictive condition(s) of transmission speed have occurred in the selected network. When the restrictive condition(s) of transmission speed have occurred, the restrictive condition(s) may be relaxed if the communication control module 52 receives the order for a relaxation of the restrictive condition(s) from the user. For example, the relaxation may raise the ceiling of the restrictive condition(s). Specifically, the communication control module 52 may access management device(s) that manage the restrictive condition(s), for example server(s) that are connected to the Internet 400, and may request for the relaxation to the management device(s). The communication control module 52 may receive the order for a relaxation of the restrictive condition(s) before or after the transmission of the selected network starts.

(A5) The communication control module 52 may interrupt sending the image forming data when the image forming data is not able to be transmitted via the selected network. After the situation regarding communication changes, the communication control module 52 may restart sending the image forming data.

(A6) When the image forming data is not able to be transmitted via the selected network, the communication control module 52 may select another network that is available. The communication control module 52 may select another network based on the priority ranking(s) or may select another network that is the fastest among the networks.

(A7) When the image forming data is not able to be transmitted via the selected network, the communication control module 52 may select another network that is available if the communication control module 52 receives a reply for a change of the selected network from the user. The communication control module 52 may select another network based on the priority ranking(s), may select another network that is the fastest in the networks, or may select based on a direction by the user.

(A8) When the image forming data is not able to be transmitted via the selected network, the communication control module 52 may have three modes. The first mode is processing described above (A5) such as interrupting sending data, the second mode is processing described above (A6) such as selecting another network automatically, the third mode is processing described above (A7) such as selecting another network based on an order from user. The communication control module 52 may select a new mode from among these three modes. For example, the communication control module 52 may perform the first mode if there is only one network corresponding the priority ranking that is directed by the user, the communication control module 52 may perform the second mode if the priority ranking is transmission speed, and the communication control module 52 may perform the third mode if the user receives a disadvantage due to the change of the selected network even though there is a network corresponding to the priority ranking that is directed by the user. However, the condition of accepting the processing mode from among these three modes is not limited as described above. For example, the processing mode may be preselected by the user or may be selected by the user when the image forming data is transmitted.

(A9) The communication control module 52 may make the display unit 10 display total charges for sending the image forming data if the priority ranking(s) are communication charges. The communication control module 52 may send the image forming data if the communication control module 52 receives a reply with an acknowledgement of the charged network from the user. The communication control module 52 may cancel sending the image forming data or may select another network, for example a free network, if the communication control module 52 receives a reply with a denial of the charged network by the user.

Processing of the Control Unit 50

Figure 3:
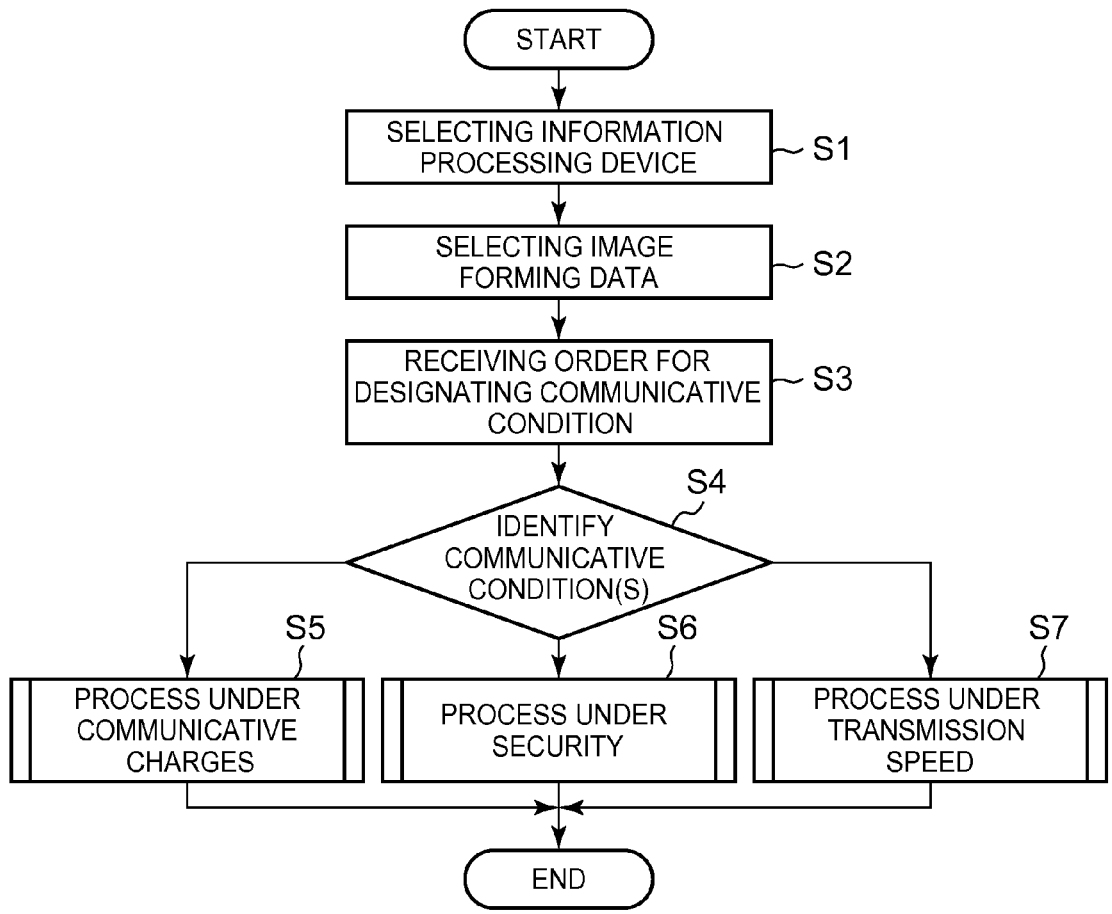
FIG. 3 is a flowchart showing control unit operation.

Referring to FIG. 3, processing of the control unit 50 is described below. In this description, for convenience, the mobile device 1 may communicate via the mobile telephone network 100 or the public wireless LAN 200. The public wireless LAN 200 may be faster than the mobile telephone network 100, charges of the public wireless LAN 200 may be cheaper than the mobile telephone network 100, the mobile telephone network 100 may be more secure than the public wireless LAN 200. In the correspondence table, the transmission speed may correspond to the public wireless LAN 200, the communication charges may correspond to the public wireless LAN, and the security may correspond to the mobile telephone network 100.

At first, the input unit 20 may receive an order for selecting the information processing device 2 by the user, and the input unit 20 may send the order to the control unit 50 (S1). The input unit 20 may receive an order for selecting the image forming data in the memory unit 30 by the user, and the input unit 20 may send the order to the control unit 50 (S2). Next, the control unit 50 may make the display unit 10 display the selection screen for communicative conditions (FIG. 4). The input unit 20 may receive the order for ranking, and the input unit 20 may send the order to the control unit 50 (S3).

The control unit 50 may identify the communicative condition(s) that are designated by the user (S4). If the communication charges are ranked highly among the communicative condition(s), the control unit 50 may perform a step 5 under the communicative condition(s) of the communication charges (S5). If the security is ranked highly among the communicative condition(s), the control unit 50 may perform a step 6 under the communicative condition(s) of the security (S6). If the transmission speed is ranked highly among the communicative condition(s), the control unit 50 may perform a step 7 under the communicative condition(s) of the transmission speed (S7).

Figure 5:
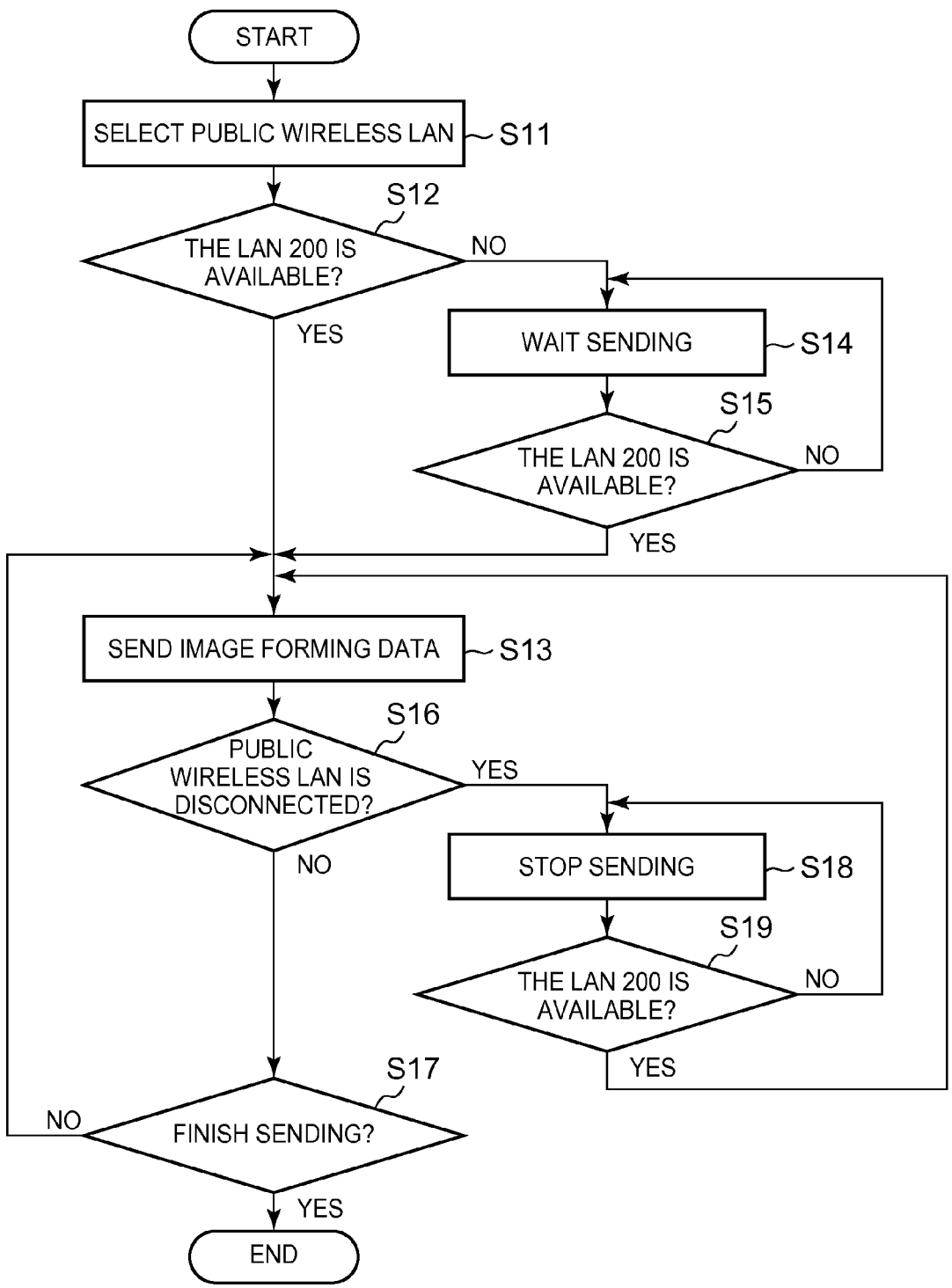
FIG. 5 is a flowchart showing control unit operation in a communication.

As shown in FIG. 5, the processes under the communicative condition(s) of the communication charges (FIG. 3, S5) are described. The control unit 50 may select the public wireless LAN 200 based on the correspondence table (S11).

Figure 6:
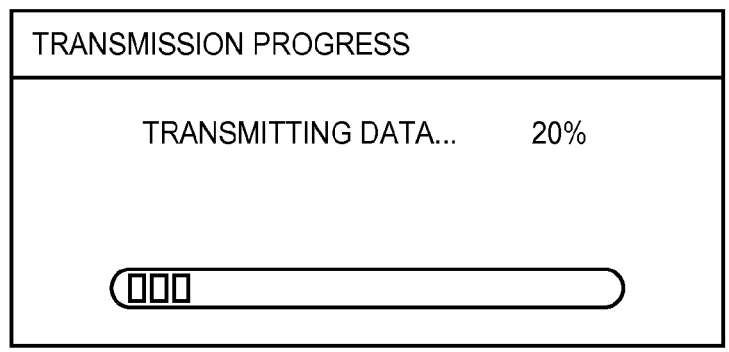
FIG. 6 illustrates a transmission screen.
Figure 7:
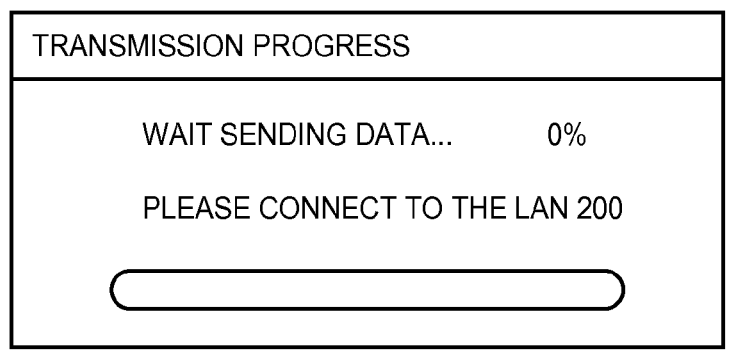
FIGS. 7 and 8 illustrate a request screen requesting a wireless network.

The control unit 50 may determine whether the public wireless LAN 200 is available at present (S12). If the public wireless LAN 200 is available, the control unit 50 may send the image forming data to the information processing device(s) 2 via the public wireless LAN 200 (S13). The control unit 50 may make the display unit 10 display the transmission screen (FIG. 6). If the public wireless LAN 200 is not available, the control unit 50 may delay sending the image forming data until the public wireless LAN 200 is available (S14). The control unit 50 may make the display unit 10 display the request screen (FIG. 7). And, when the public wireless LAN 200 is available (S15, YES), the control unit 50 may send the image forming data to the information processing device(s) via the public wireless LAN 200 (S13).

Figure 8:
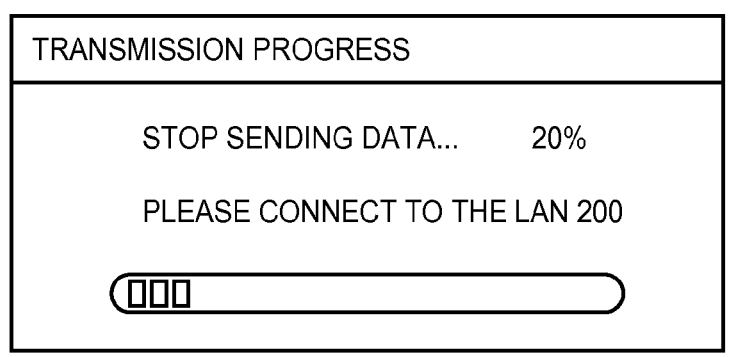

The control unit 50 may check whether the public wireless LAN 200 is disconnected (S16). If the public wireless LAN 200 is not disconnected, the control unit 50 may check whether the sending of the image forming data has finished (S17). If the sending for the image forming data does has not finished (S17), the control unit 50 may send the rest of the image forming data (S13). If the sending of the image forming data has finished (S17), the process under the communicative condition(s) of the communication charges finishes (END). On the one hand, if the public wireless LAN 200 is disconnected, the control unit 50 may stop sending the image forming data until the public wireless LAN 200 is connected again (S18, S19). The control unit 50 may make the display unit 10 display the request screen (FIG. 8). If the public wireless LAN 200 is connected, the control unit 50 may restart sending the rest of the image forming data (S13).

In the processes under the communicative condition(s) of the communication charges in FIG. 5, the fees of the public wireless LAN 200 may be more reasonable than the mobile telephone network 100, and the public wireless LAN 200 may be selected on a priority basis. However, a situation of the fees is not limited, for example, the fees of the mobile telephone network 100 may be more reasonable than the public wireless LAN 200, and the mobile telephone network 100 may be selected on a priority basis.

Figure 9:
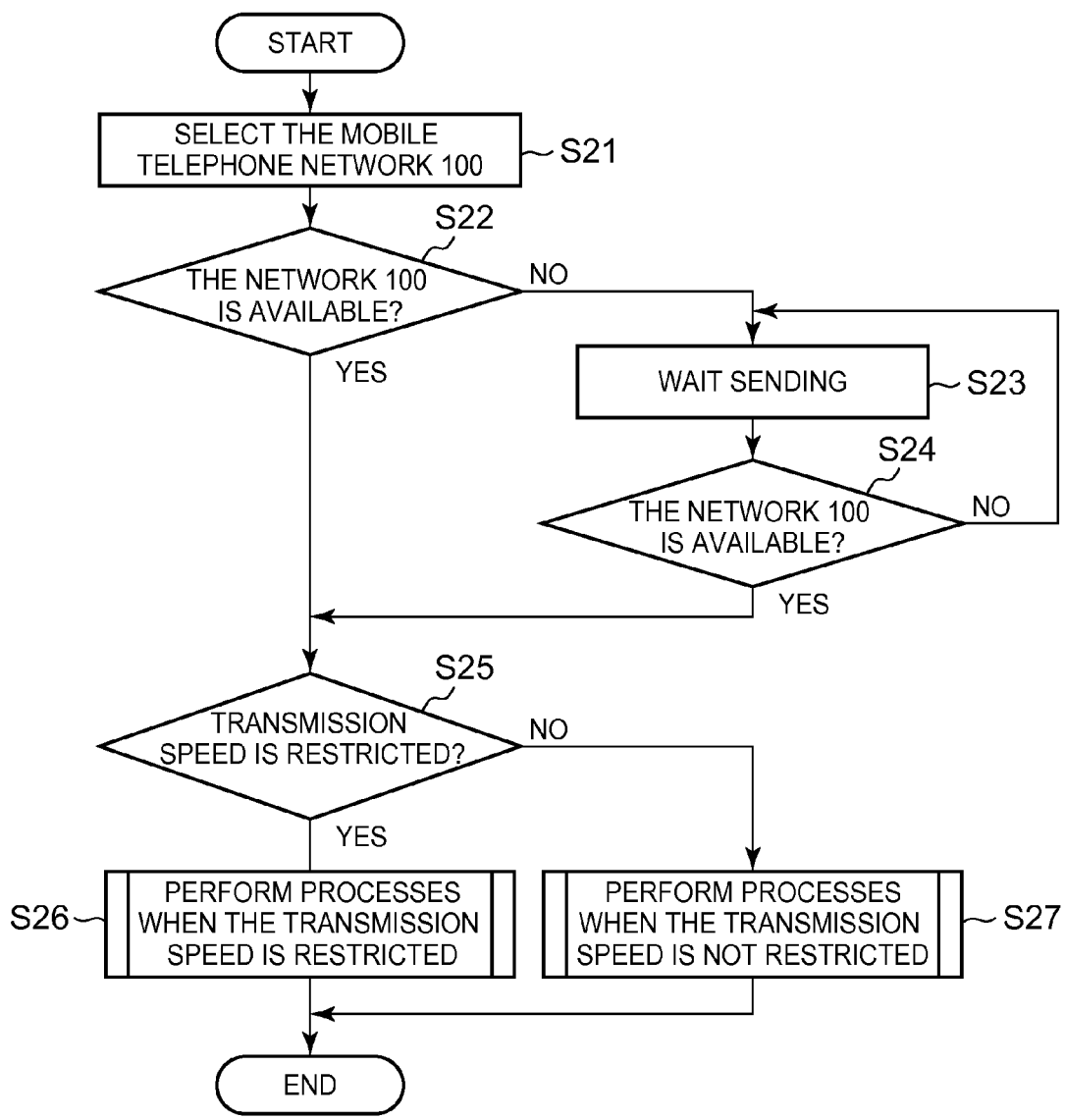
FIG. 9 is a flowchart showing control unit operation in a communication.

As shown in FIG. 9, the processes under the communicative condition(s) of the security (FIG. 3, S6) are described. The control unit 50 may select the mobile telephone network 100 based on the correspondence table (S21).

Figure 10:
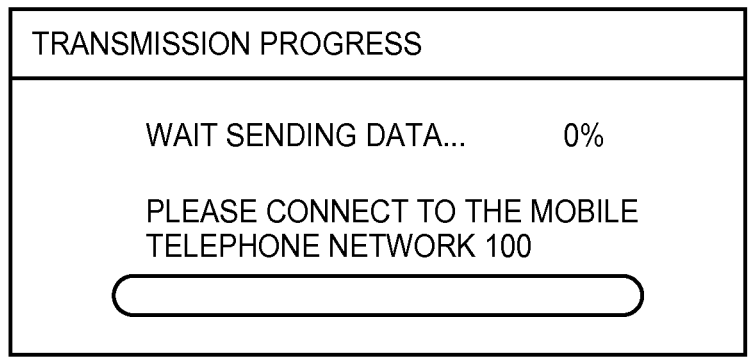
FIG. 10 illustrates a request screen requesting a mobile telephone network.

The control unit 50 may determine whether the mobile telephone network 100 is available at present (S22). If the mobile telephone network 100 is available, the control unit 50 may perform step S25. If the mobile telephone network 100 is not available, the control unit 50 may delay sending the image forming data until the mobile telephone network 100 is available (S23, S24). The control unit 50 may make the display unit 10 display the request screen (FIG. 10). Next, if the mobile telephone network 100 is available (S24), the control unit 50 may perform step S25.

Next, the control unit 50 may check whether the restrictive condition(s) of transmission speed have occurred in the mobile telephone network 100 (S25). Specifically, the communication control module 52 may calculate the cumulative communication volumes in the latest predetermined daily period, and compare the cumulative communication volumes with the transmission ceiling. If the cumulative communication volumes are greater than the transmission ceiling (S25, YES), the control unit 50 may perform step S26 that is processes when the restrictive condition(s) of transmission speed have occurred. If the cumulative communication volumes are less than the transmission ceiling (S25, NO), the control unit 50 may perform step S27 that is processes when the restrictive condition(s) of transmission speed have not occurred.

Figure 11:
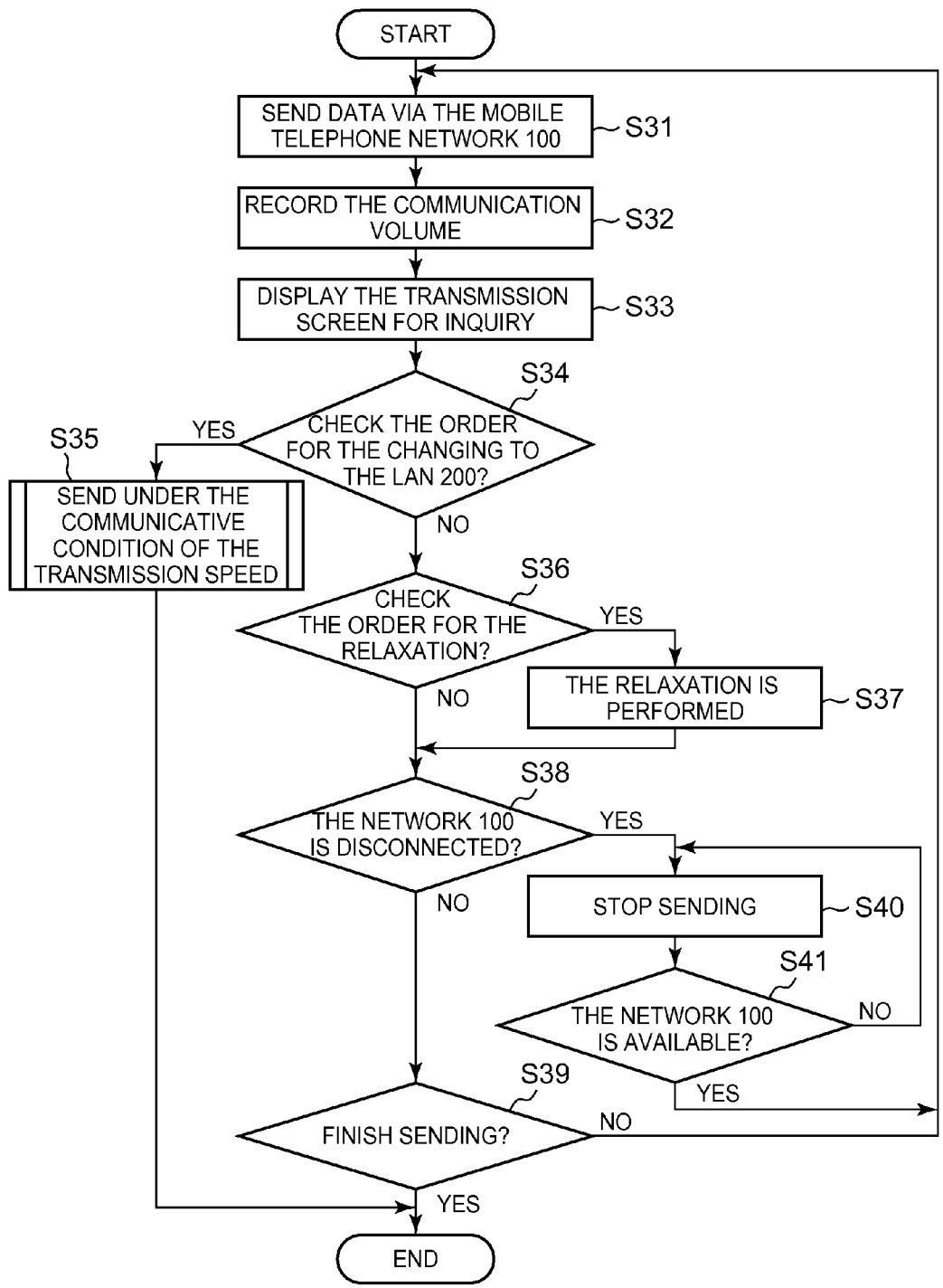
FIG. 11 is a flowchart showing the control unit operation in a band-limited communication.

As shown in FIG. 11, the control unit 50 may send the image forming data to the information processing device(s) via the mobile telephone network 100 (S31). While the control unit 50 sends the image forming data, the control unit 50 may record the communication volume in the memory unit 30 (S32). Specifically, the control unit 50 may add the communication volume and the first communication volume $A_0$, and may update the first communication volume $A_0$.

Figure 13:
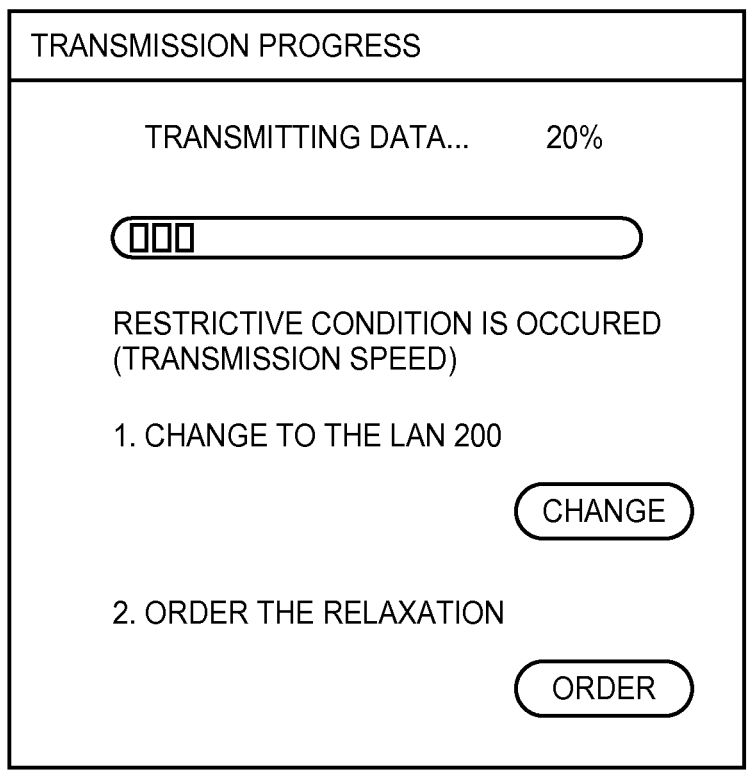
FIG. 13 illustrates a transmission screen.

When the restrictive condition(s) of transmission speed have occurred in the mobile telephone network 100, the transmission speed may be slow. Thus, the control unit 50 may make the display unit 10 display the transmission screen for an inquiry to the user (S33). As shown in FIG. 13, the transmission screen may include the information of the progress in sending the image forming data and the information for receiving request about a changing from the mobile telephone network 100 to the public wireless LAN 200 or receiving an order for a relaxation of the restrictive condition(s).

The control unit 50 may check whether the order for the changing from the mobile telephone network 100 to the public wireless LAN 200 is received (S34). If there is the order for the changing (S34, YES), step S35 may be performed under the communicative condition(s) of the transmission speed. If there is no order for the changing (S34, NO), the control unit 50 may check whether the order for the relaxation of the restrictive condition(s) is received (S36). If there is the order for the relaxation (S36, YES), a step S37 that includes collecting an additional fee and raising the ceiling of restrictive condition(s) may be performed. If there is no order for the relaxation (S36, NO), a step S38 may be performed.

Figure 14:
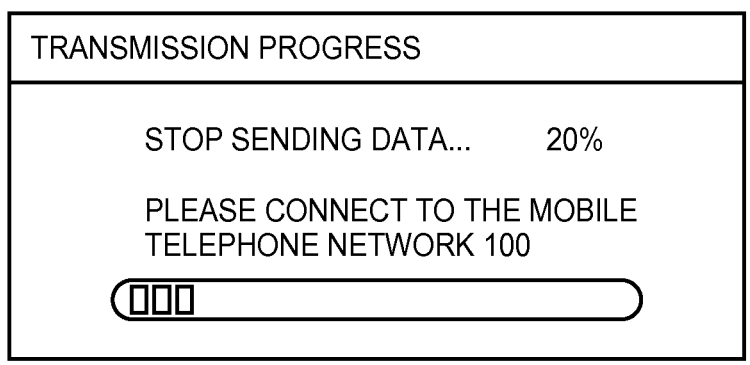
FIG. 14 illustrates a request screen requesting a mobile telephone network.

The control unit 50 may check whether the mobile telephone network 100 is disconnected (S38). If the mobile telephone network 100 is not disconnected, the control unit 50 may check whether the sending of the image forming data has finished (S39). If the sending for the image forming data has not finished (S39, NO), the control unit 50 may send the rest of the image forming data (S31). If the sending of the image forming data has finished (S39), the processes under the communicative condition(s) of the communication charges finishes (END). On the other hand, if the mobile telephone network 100 is disconnected (S38, YES), the control unit 50 may stop sending the image forming data until the mobile telephone network 100 is connected again (S40, S41). The control unit 50 may make the display unit 10 display the request screen (FIG. 14). If the mobile telephone network 100 is connected, the control unit 50 may restart sending the rest of the image forming data (S31).

Figure 12:
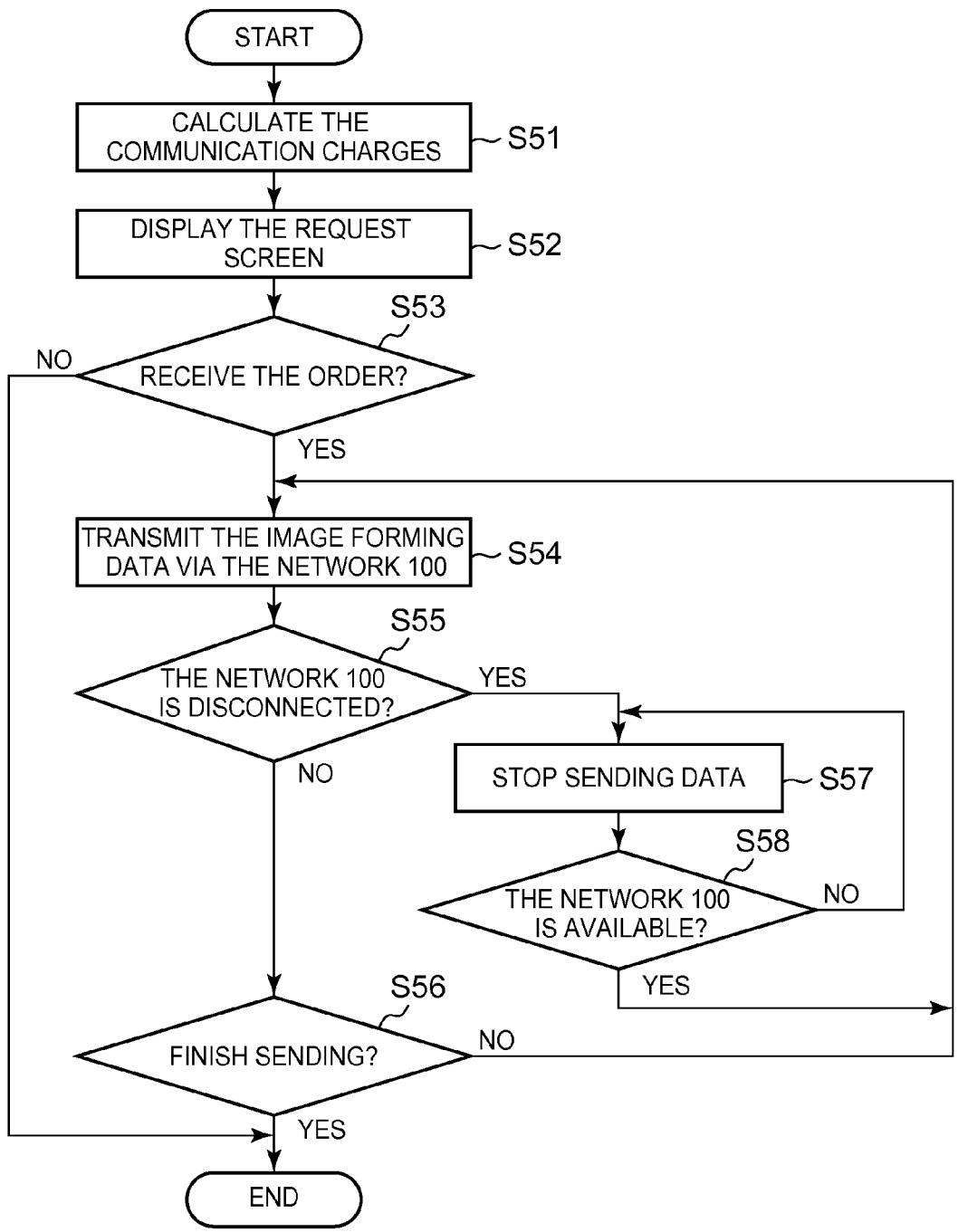
FIG. 12 is a flowchart showing the control unit operation in a communication without band limitation.

As shown in FIG. 12, the control unit 50 may calculate the communication charges based on a size of the image forming data when the restrictive condition(s) of transmission speed have not occurred (S51). The control unit 50 may make the display unit 10 display a request screen for requesting image forming (S52, FIG. 15). As shown in FIG. 15, the request screen may include the cumulative communication volumes at present, the cumulative communication volumes after sending the image forming data, the transmission ceiling, communication volume needed to send, and the communication charges. Thus, the control unit 50 may make the user check the status of transmission and communication charges.

The control unit 50 may identify the order regarding the requesting image forming is received via the input unit 20 (S53). If the order is an acknowledgement of the requesting image forming (S53, YES), the control unit 50 may transmit the image forming data via the mobile telephone network 100 (S54). If the order is a denial of the requesting image forming (S53, NO), the control unit 50 may finish the processes (END).

The control unit 50 may check whether the mobile telephone network 100 is disconnected (S55). If the mobile telephone network 100 is not disconnected (S55, NO), the control unit 50 may check whether the sending of the image forming data has finished (S56). If the sending for the image forming data has not finished (S56, NO), the control unit 50 may send the rest of the image forming data (S54). If the sending for the image forming data has finished (S56, YES), the processes finishes (END). On the other hand, if the mobile telephone network 100 is disconnected (S55, YES), the control unit 50 may stop sending the image forming data until the mobile telephone network 100 is connected again (S57, S58). The control unit 50 may make the display unit 10 display the request screen (FIG. 14). If the mobile telephone network 100 is connected (S58, YES), the control unit 50 may restart sending the rest of the image forming data (S54).

The control unit 50 may make the display unit 10 display the request screen (FIG. 15) when the cumulative communication volume during a predetermined period is less than a predetermined volume in the mobile telephone network 100. The control unit 50 may send the image forming data via the mobile telephone network 100 if the input unit 20 receives the acknowledgement of the requesting image forming. The control unit 50 may not make the display unit 10 display the request screen (FIG. 15) when the cumulative communication volume during the predetermined period is more than the predetermined volume in the mobile telephone network 100. The control unit 50 may send the image forming data via the mobile telephone network 100 without the acknowledgement for the requesting image forming.

In the processes under the communicative condition(s) of security in FIG. 9, the security in the mobile telephone network 100 may be more secure than the public wireless LAN 200, and the mobile telephone network 100 may be selected on a priority basis. However, a situation of the security is not limited, for example, the security in the public wireless LAN 200 may be more secure than the mobile telephone network 100, and the public wireless LAN 200 may be selected on a priority basis.

Figure 16:
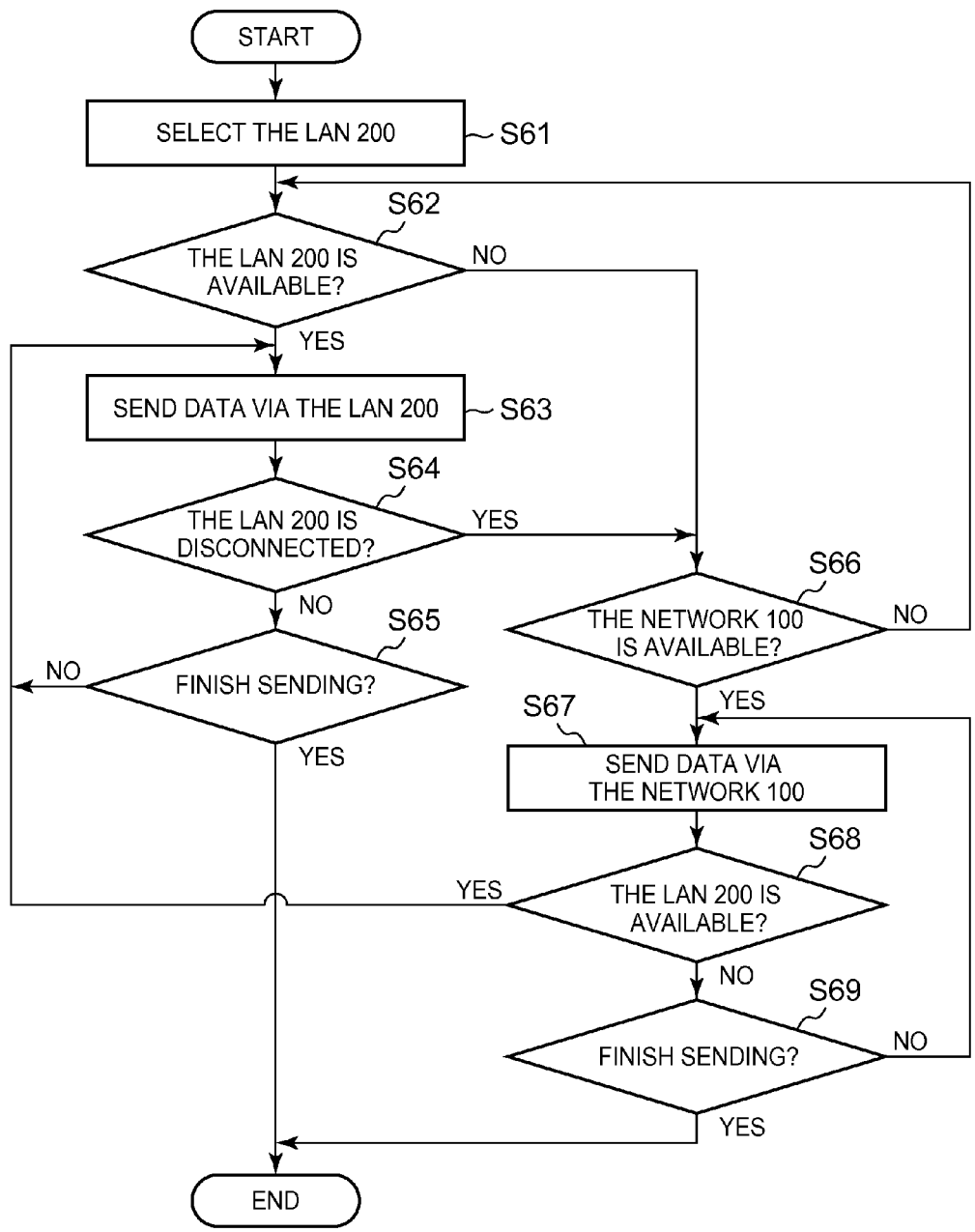
FIG. 16 is a flowchart showing the control unit operation in a communication.

As shown in FIG. 16, the processes under the communicative condition(s) of the transmission speed (FIG. 3, S7) are described. The control unit 50 may select the public wireless LAN 200 based on the correspondence table (S61).

The control unit 50 may determine whether the public wireless LAN 200 is available at present (S62). If the public wireless LAN 200 is available (S62, YES), the control unit 50 may send the image forming data to the information processing device(s) 2 via the public wireless LAN 200 (S63). The control unit 50 may make the display unit 10 display the transmission screen (FIG. 6). If the public wireless LAN 200 is not available (S62, NO), a step S66 may be performed.

The control unit 50 may check whether the public wireless LAN 200 is disconnected (S64). If the public wireless LAN 200 is not disconnected (S64, NO), the control unit 50 may check whether the sending of the image forming data has finished (S65). If the sending for the image forming data has not finished (S65, NO), the control unit 50 may send the rest of the image forming data (S63). If the sending for the image forming data has finished (S65, YES), the processes under the communicative condition(s) of the transmission speed finishes (END). On the other hand, if the public wireless LAN 200 is disconnected (S64, YES), a step S66 may be performed.

The control unit 50 may determine whether the mobile telephone network 100 is available at present (S66). If the mobile telephone network 100 is available (S66, YES), the control unit 50 may send the image forming data to the information processing device(s) 2 via the mobile telephone network 100 (S67). If the mobile telephone network 100 is not available (S66, NO), the control unit 50 may again determine whether the public wireless LAN 200 is available at present (S62).

The control unit 50 may check whether the public wireless LAN 200 is disconnected (S68). If the public wireless LAN 200 is connected (S68, YES), the control unit 50 may change the mode to sending data via the public wireless LAN 200 (S63). If the public wireless LAN 200 is disconnected (S68, NO), the control unit 50 may check whether the sending for the image forming data has finished (S69). If the sending for the image forming data has not finished (S69, NO), the control unit 50 may send the rest of the image forming data (S67). If the sending for the image forming data has finished (S69, YES), the process under the communicative condition(s) of the transmission speed finishes (FIG. 16, END).

In the processes under the communicative condition(s) of the transmission speed in FIG. 16, the transmission speed in the public wireless LAN 200 may be faster than the mobile telephone network 100, and the public wireless LAN 200 may be selected on a priority basis. However, the transmission speed in the mobile telephone network 100 may be faster than the public wireless LAN 200, and the mobile telephone network 100 may be selected on a priority basis.

Figure 17:
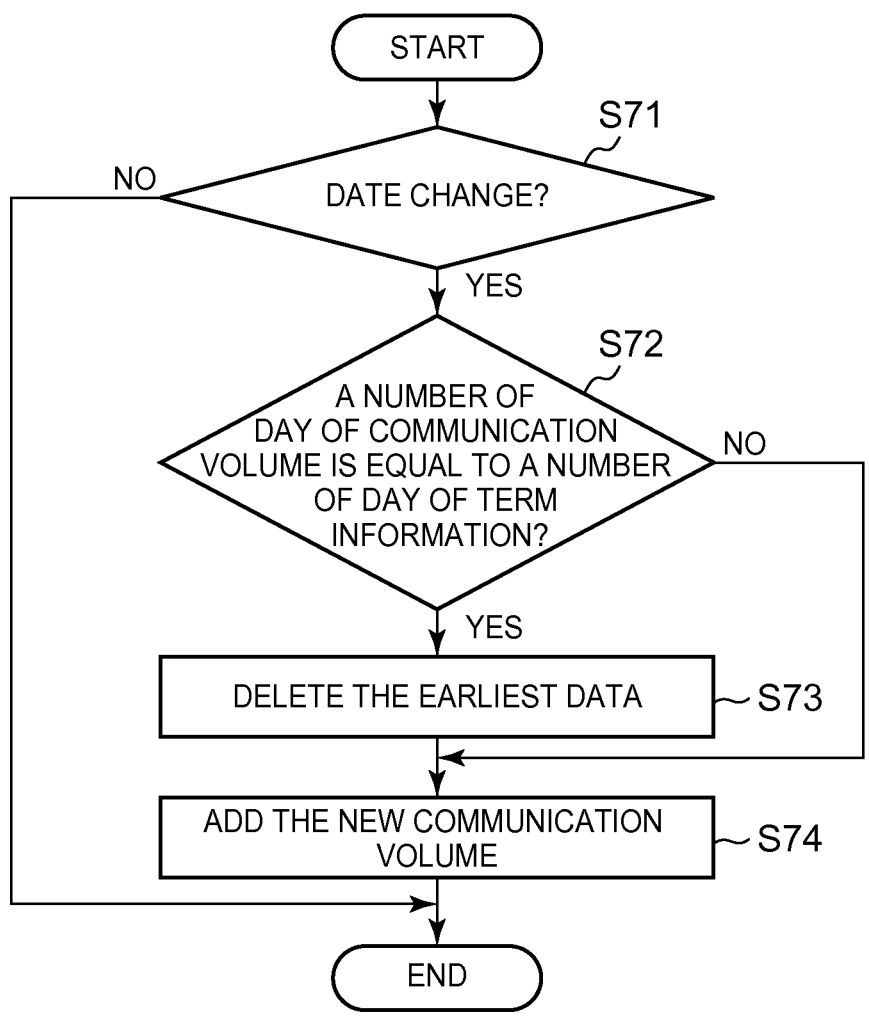
FIG. 17 is a flowchart showing the control unit operation when an update is executed.

FIG. 17 shows a process of updating the communication volume information. FIG. 17 is a flowchart showing the control unit operation when an update is executed. The processes of the updating may be executed periodically.

The control unit 50 may check whether a date has changed (S71). If the date has changed (S71, YES), the control unit 50 may update the communication volume information (S72, S73, S74). If the date has not changed (S71, NO), the processes of the updating may finish (END).

The control unit 50 may compare a number of day(s) of the communication volume ($A_0$ to $A_N$) (FIG. 2) with a number of day(s) of the term information (S72). If both (all) of the days are equal (S72, YES), the control unit 50 may delete the earliest data, for example communication volume ($A_N$) (S73), and may add the new communication volume (A) at the head of the communication volume (S74). And, if the day(s) of the communication volume ($A_0$ to $A_N$) are less than the number of day(s) of the term information (S72, NO), the step S74 is performed. As described above, when the date is changed, today's communication volume ($A_0$) may be stored at the head, yesterday's communication volume ($A_1$) may be stored at next to the head, in the same way all of the values shift by one, . . . , the $N^{th}$ day's communication volume ($A_N$) ago may be stored at the end, and the control unit 50 may calculate the cumulative communication volumes based on the communication volume ($A_0$ to $A_N$).

The mobile device 1 changes between the mobile telephone network 100 and the public wireless LAN 200 during the process, because a range that indicates radio signal(s) approach the mobile device 1 may fluctuate. Thus, the mobile device 1 may communicate via either the mobile telephone network 100 or the public wireless LAN 200 due to the fluctuating, because the radio signal(s) from mobile device 1 may approach either the base station 110 or the AP 210.

(1) As described in the first embodiment, the mobile device 1 may receive the order for ranking communicative condition(s), and may select a network from among networks 100, 200, and 300 based on the priority ranking. Thus, the mobile device 1 may communicate effectively via the chosen network, and may improve convenience for the user. For example, if the user wants to communicate fast, the mobile device 1 may select the fastest network from among networks 100, 200, and 300. And, if the user wants to communicate cheap, the mobile device 1 may select the cheapest network from among networks 100, 200, and 300.

(2) As described above, the communication control module may have the function (A1). Thus, the mobile device 1 may also properly and effectively select a network based on the restrictive condition(s) of transmission speed. For example, if the communicative condition places high value on the transmission speed, the mobile device 1 may properly and effectively change to another network, because the transmission speed decreases under the restrictive condition(s) of transmission speed.

(3) The communication control module may have the function (A2). Thus, when there are the restrictive condition(s) of transmission speed in the network, the mobile device 1 may inform the user about the restrictive condition(s) to avoid sending data unexpectedly for the user. For example, the mobile device 1 may select the network based on acknowledgement by the user, thus the mobile device 1 may avoid the unexpected sending of data via the network that occurs during the restrictive condition(s).

(4) The communication control module may have the function (A3). Thus, when the restrictive condition(s) of transmission speed have occurred in the network, the mobile device 1 may change another network according to the reply from the user.

(5) The communication control module may have the function (A4). Thus, when the restrictive condition(s) of transmission speed are occurred in the network, the mobile device 1 may relax the restrictive condition(s) according to the reply from the user.

(6) The communication control module may have the function (A5). Thus, the mobile device 1 may communicate via the network that is selected based on the communicative condition(s) without changing network(s).

(7) The communication control module may have the function (A6). Thus, the mobile device 1 may finish sending data fast by changing to another network rather than by stopping sending data when the network is disconnected. When the communicative condition(s) place high value on the transmission speed, the mobile device 1 may finish sending data more quickly according to the priority.

(8) The communication control module may have the function (A7). Thus, the mobile device 1 may finish sending data fast by changing to another network rather than by stopping sending data when the network is disconnected. And, the mobile device 1 may change to another network according to the reply for changing network from the user. Thus, the mobile device 1 may avoid changing network improperly.

(9) The communication control module may have the function (A8). Thus, the mobile device 1 may perform processes more properly than the mobile device 1 may perform processes if the mobile device 1 had only one mode.

Configuration of the Information Processing System in the Second Embodiment

Figure 18:
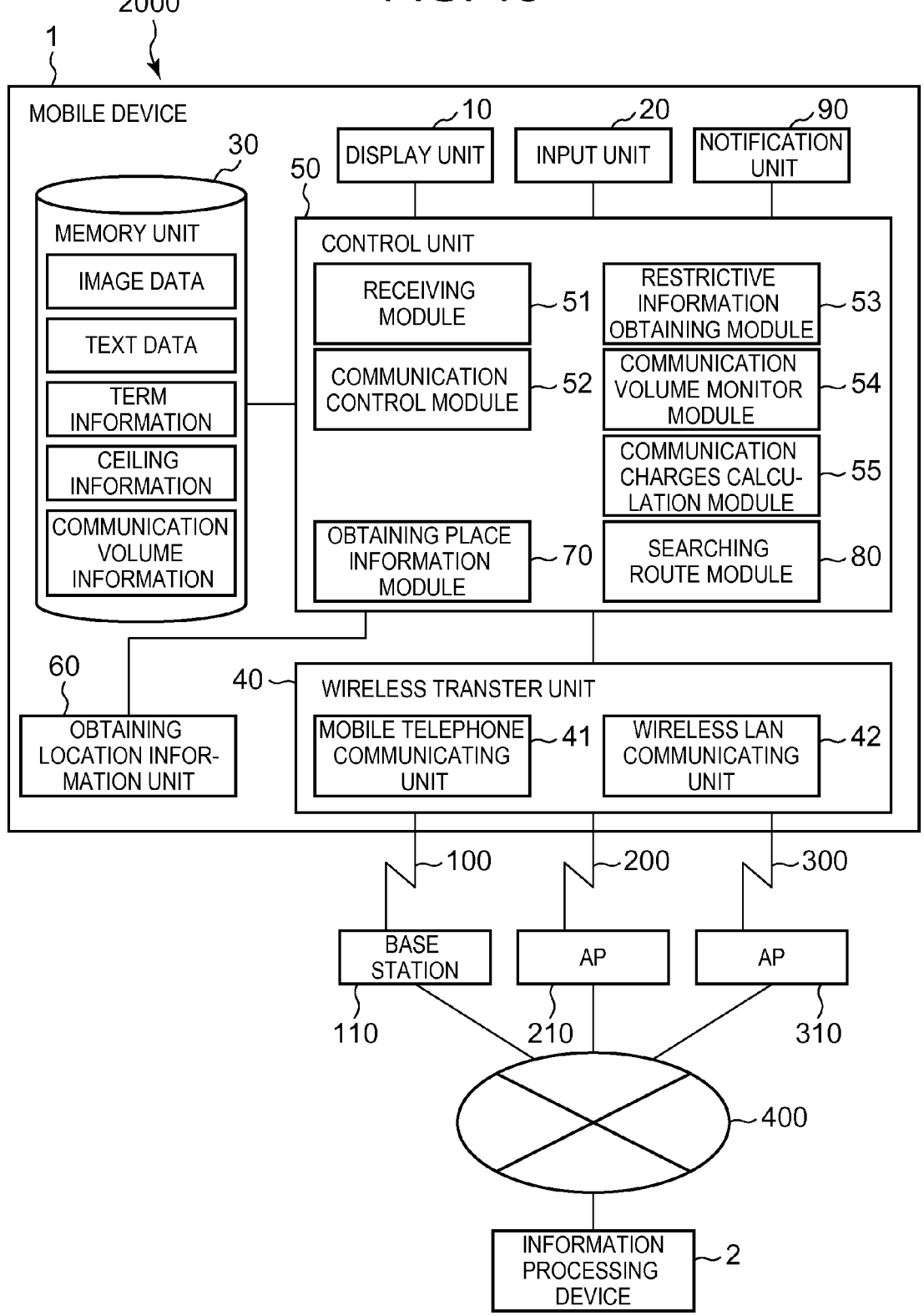
FIG. 18 is a schematic block diagram showing the composition of an information processing system according to a second illustrative embodiment.
Figure 19:
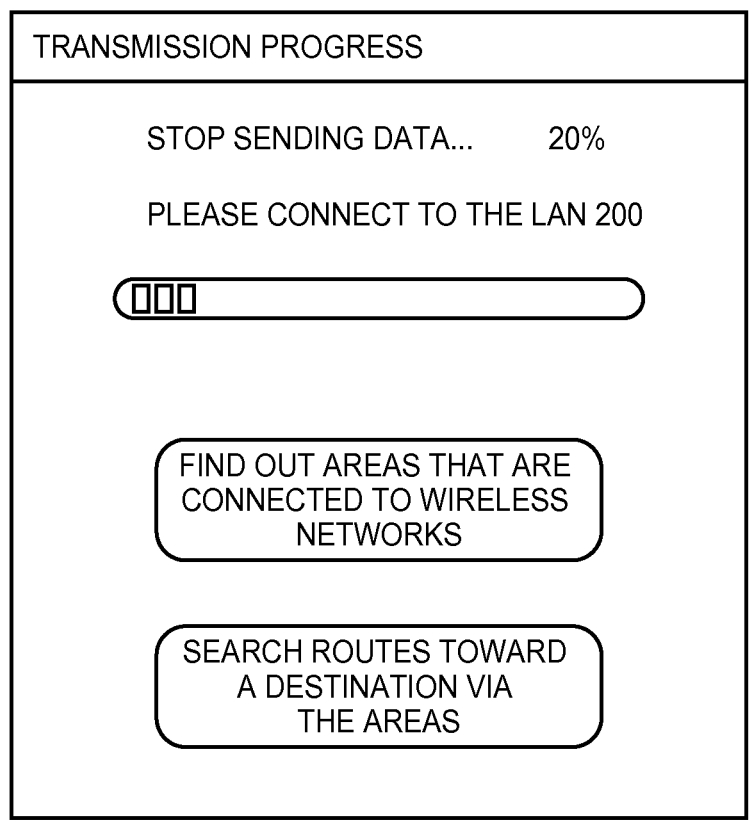
FIG. 19 illustrates a request screen requesting a wireless network by the mobile device in FIG. 18.

As shown in FIG. 18, the mobile device 1 includes an obtaining location information unit 60, an obtaining place information module 70, a searching route module 80, and a notification unit 90 in addition to the configuration of the mobile device 1 in the first embodiment.

The obtaining location information unit 60 may obtain present location information of the mobile device 1. The obtaining location information unit 60 may obtain the location information by receiving radio signal(s) from a GPS (Global Positioning System) satellite. The location information may include longitude and latitude.

The obtaining place information module 70 may obtain place information that indicates where area(s) are accessible to wireless network(s) for transmitting and receiving signals, for example, the obtaining place information module 70 may locate area(s) of a public wireless LAN 200 or AP(s) 210 as the. The obtaining place information module 70 may locate them using services on the Internet, and may locate them using information, for example address information, of the public wireless LAN 200 in the memory unit 30 or control unit 50.

The searching route module 80 may search route(s) from a source to a destination via the area(s) that are accessible. The searching route module 80 may search the route(s) using services on the Internet. The searching route module 80 also may obtain distance(s) from a source to a destination, for example, the number of hops.

The notification unit 90 may notify the user that the mobile device 1 maintains its status or changes its status by using sounds or vibrations.

The communication control module 52 may include the functions described below.

(B1) The communication control module 52 may obtain the location information, obtain the place information based on the location information, and make the display unit 10 display the place information, for example map(s), if the selected network is not available at present. As shown in FIG. 18, the communication control module 52 may receive the location information that the obtaining location information unit 60 makes, and receive the place information that the obtaining place information module 70 makes based on the location information. Thus, the mobile device 1 may improve convenience for the user.

(B2) The communication control module 52 may obtain both the location information and the destination information, for example, destination IP address, may search the route(s) based on the location information and destination information. Moreover, the communication control module 52 may make the display unit 10 display the route(s), for example map(s) that show the route(s), if the selected network is not available at present. As shown in FIG. 18, the communication control module 52 may receive the location information that the obtaining location information unit 60 makes, and may receive the destination information that both the display unit 10 and the display unit 20 makes. Moreover, the communication control module 52 may receive the route(s) that the searching route module 80 makes based on both of the location information and the destination information. Thus, the mobile device 1 may improve convenience for the user.

(B3) The communication control module 52 may notify the user if the mobile device 1 moves into the area(s) that are accessible to the wireless network(s). As shown in FIG. 18, the communication control module 52 may receive the notice information that the notification unit 90 makes, and may notify the user. For example, the communication control module 52 may monitor a location of the mobile device 1, check whether the area(s) includes the location of the mobile device 1, and notify the user if the area(s) include the location of the mobile device 1. The communication control module 52 may notify the user if the selected network starts working again.

Processing of the Control Unit 50

The processing of the control unit 50 in the second embodiment may have the same processing in the first embodiment. Different parts in the second embodiment that are compared with the first embodiment are described below.

When the mobile device 1 waits for a connection to wireless network(s), for example steps S14 and S15 (FIG. 5) are performed repeatedly and steps S18 and S19 (FIG. 5) are performed repeatedly, the control unit 50 may make the display unit 10 a screen (FIG. 19) indicating waiting for a connection to wireless network(s). The screen for waiting for a connection to wireless network(s) may have selective options that include finding out the area(s) or searching route(s) toward the destination via the area(s).

Figure 20:
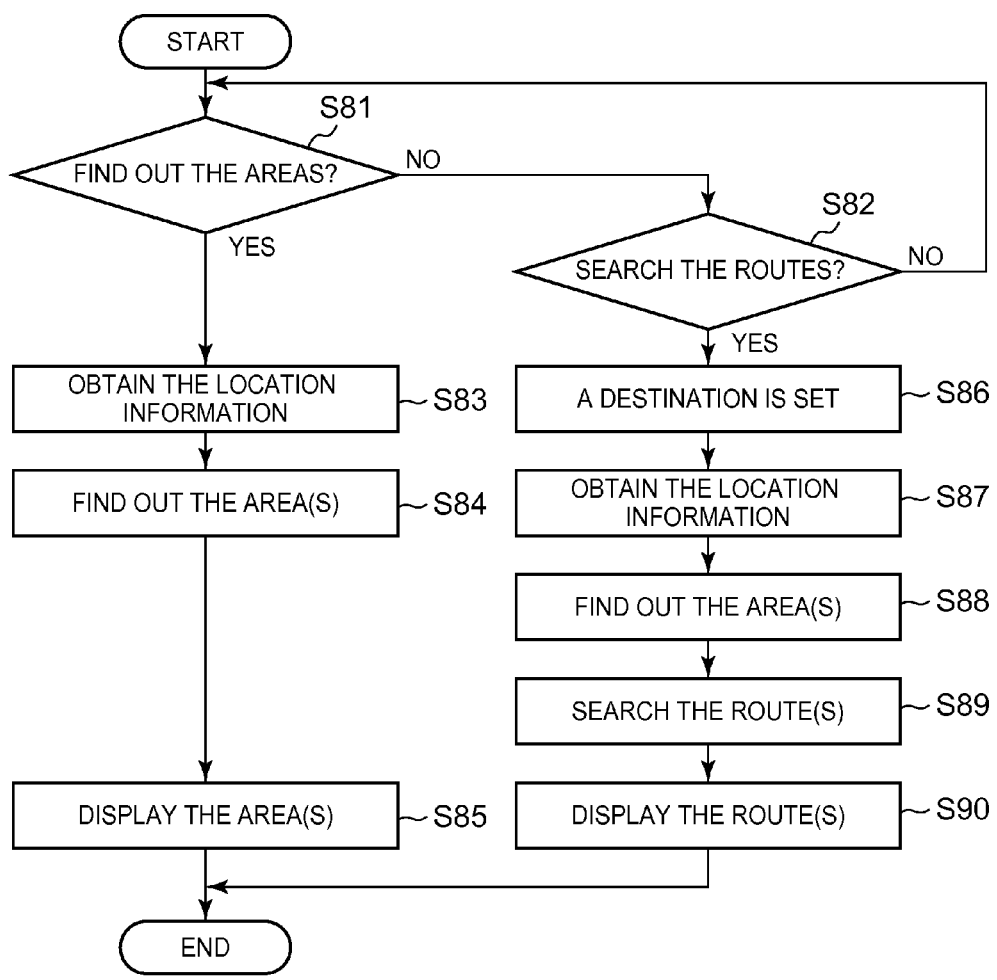
FIG. 20 is a flowchart showing the control unit operation in FIG. 18.

Next, the control unit 50 may perform the processes in FIG. 20. The processes in FIG. 20 and FIG. 5 may be performed in parallel.

As shown in FIG. 20, the control unit 50 may wait for the order to find out the area(s) or to search route(s) toward the destination via the area(s) (S81, S82).

If the control unit 50 receives the order to find out the area(s) (S81, YES), the control unit 50 may obtain the location information that the obtaining location information unit makes (S83), and may send the location information to the obtaining place information module 70. The obtaining place information module 70 may find out the area(s) that are accessible around present location of the mobile device 1 (S84). As a result of searching by the obtaining place information module 70, the display unit 10 may display the area(s) as place information on the map(s) (S85).

If the control unit 50 receives the order to search route(s) toward the destination via the area(s) (S82, YES), the control unit 50 may make the display unit 10 display a screen for setting a destination, and the control unit 50 may obtain the destination that is set by user (S86). Next, the control unit 50 may obtain the location information that the obtaining location information unit makes (S87), and may send the location information to the obtaining place information module 70. The obtaining place information module 70 may find out the area(s) that are accessible around present location of the mobile device 1 (S88). Moreover, the control unit 50 may send the location information and the destination, and the searching route module 80 may search the route(s) (S89). As a result of searching by the searching route module 80, the display unit 10 may display the route(s) that are the shortest on the map(s) (S90).

Figure 21:
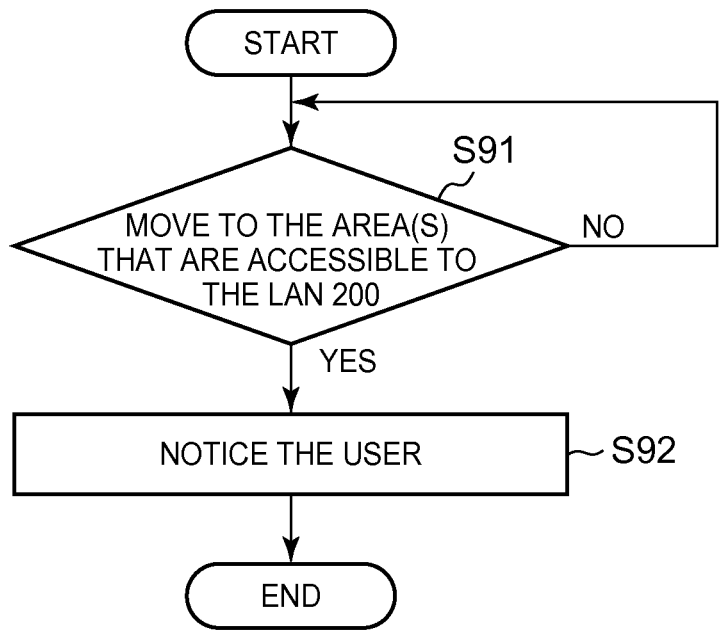
FIG. 21 is a flowchart showing the control unit operation for notification of communications status in FIG. 18.
Figure 22:
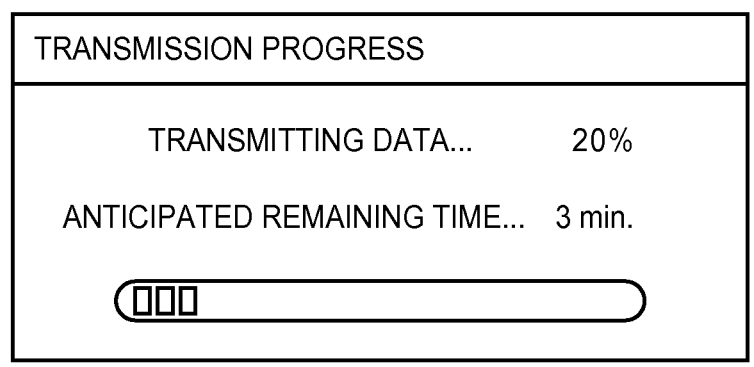
FIG. 22 illustrates a transmission screen by the mobile device in FIG. 18.

As shown in FIG. 21, the control unit 50 may perform these processes. The processes in FIG. 21 and FIG. 5 may be performed in parallel.

The control unit 50 may wait until the mobile device 1 moves to the area(s) that are accessible to the wireless network(s) (S91). If the mobile device 1 moves to the area(s) (S91, YES), the control unit 50 may notify the user that the mobile device 1 now communicates via wireless network(s) due to the moving of the mobile device 1 (S92).

The control unit 50 may make the display unit 10 display a screen for informing a progress of sending the image forming data and an anticipated finish time of sending the image forming data. Specifically, the display unit 10 may display the transmission screen (FIG. 22) while sending the image forming data, and the notification unit 90 may notify the user when the image forming data finishes being sent.

In addition to features (1) to (9) above, there may be additional features as described below.

(10) If the selected network is not available, the control unit 50 may obtain the location information. The obtaining place information module 70 may find out the area(s) that are accessible around present location of the mobile device 1. As a result of searching by the obtaining place information module 70, the display unit 10 may display these area(s) as the place information on the map(s). Thus, the mobile device 1 may improve a convenience to use the system for the user.

(11) If the selected network is not available, the control unit 50 may obtain the destination. Next, the control unit 50 may obtain the location information, and the obtaining place information module 70 may find out the area(s) that are accessible around present location of the mobile device 1. Moreover, the control unit 50 may send the location information and the destination, and the searching route module

80 may search the route(s) toward the destination. As a result of this searching by the searching route module 80, the display unit 10 may display the route(s) on the map(s). Thus, the mobile device 1 may improve a convenience to use the system for the user.

Other Embodiments

The image forming system includes the mobile telephone network 100, the public wireless LAN 200, and the personal wireless LAN 300 as wireless networks. However, the wireless networks is not limited to the mobile telephone network 100, the public wireless LAN 200, and the personal wireless LAN 300, for example, the image forming system may include Blue Tooth (registered mark) and WiMAX (Worldwide Interoperability for Microwave Access) connections.

The mobile device 1 transmits the image forming data to the information processing device 2. However, the destination of transmitting the image forming data is not limited to the information processing device 2, for example, the mobile device 1 may transmit the image forming data to another mobile device(s) or server(s).

The receiving module 51 receives the order for selecting the first priority ranking among communicative condition(s) that is given the highest value. However, the order for selecting the priority ranking is not limited to the order for selecting the first priority ranking that is given the highest value. For example, the priority ranking may include not only the first priority ranking but also the second priority ranking, and the placing value may include not only the highest value but also the less than the second highest value.

The control unit 50 selects the wireless network based on the correspondence table. However, the way to select the wireless network is not limited to the correspondence table. For example, at first, the control unit 50 may check whether only one network corresponds to the first priority ranking among the communicative condition(s). Second, if more than one network is identified, the control unit 50 may check whether only one network corresponds to the second priority ranking among the communicative condition(s). If only one network is identified, the control unit 50 selects that network. As described above, the control unit 50 selects networks by checking a number of network(s) corresponding to each priority rankings. Moreover, each network(s) may have level value(s) corresponding each the communicative condition(s), and the control unit 50 may calculate evaluated value(s) based on the level value(s) and each weighted value(s) corresponding priority ranking(s), and the control unit 50 may select the network whose evaluated value is the highest in the networks.

The processes in the first embodiment and the second embodiment are not limited. For example, the control unit 50 may receive the order for setting the priority ranking before receiving the order for forming image that is designated data by the user, and the control unit 50 may select the network based on the order for setting the priority ranking before receiving the order for selecting the image forming data.

The communicative conditions may include utilizable area(s) in addition to the transmission speed, the communication charges, and the security. And, the communicative conditions may have at least one of the transmission speed, the communication charges, the security, and the utilizable area(s).

The image forming data may be printing data, and the information processing device(s) may be at least one of printer(s), copy device(s), fax device(s), and MFP(s) (Multifunction Printer, Peripheral, or Product). Thus, they may print based on the printing data.

While the foregoing has particularly shown and described with reference to certain specific embodiments, it will be understood by those skilled in the art that the foregoing and other changes in form and details can be made therein without departing from the spirit and scope of the appended claims.

What is claimed is:

1. A mobile device, comprising:
   a wireless communicating unit configured to communicate via a plurality of kinds of wireless networks;
   an input unit configured to receive an order ranking and prioritizing one or more communicative conditions; and
   a communication control module configured to select a first wireless network from a plurality of available wireless networks based on the priority ranking that is a result of the ranking and prioritizing of the one or more communicative conditions, and to control the wireless communicating unit so as to transmit data via the first wireless network, wherein
   the communication control module determines if a transmission speed of the first wireless network is restricted or not restricted;
   the communication control module requires an acknowledgement of use for the first wireless network from the user if the transmission speed is not restricted in order to send data via the first network; and
   the communication control module does not require an acknowledgement of use for the first wireless network from the user if the transmission speed is restricted in order to send the data via the first network, wherein
   the communication control module selects the first wireless network after receiving the acknowledgement when the transmission speed is not restricted, and
   the communication control module determines that the transmission speed is restricted to a slower transmission speed if accumulated communication volume for a set period is greater than a reference volume.

2. The mobile device of claim 1, wherein the one or more communicative conditions include at least two of followings:
   transmission speed, communication charges, security, and utilizable area to connect to networks.

3. The mobile device of claim 2, wherein
   the communication charges are calculated based on a size of the data to send when the transmission speed has not been restricted.

4. The mobile device of claim 2, wherein
   the communication charges are displayed on a screen along with the cumulative communication volumes and a transmission ceiling.

5. The mobile device of claim 1, wherein
   the plurality of available wireless networks include a limited wireless network, whose transmission speed is restricted when a restrictive condition occurs;
   the communication control module is configured to select the first wireless network from the plurality of available wireless networks based on whether one of the plurality of available wireless networks is the limited wireless network, in which the restrictive condition has occurred, restricting the transmission speed of the limited wireless network.

6. The mobile device of claim 5, further comprising:
a restrictive information obtaining module configured to obtain restrictive information that indicates whether the restrictive condition has occurred in the limited wireless network;
a communication volume monitor module configured to monitor the limited wireless network; wherein, the communication control module is configured to determine whether the limited wireless network is restricted regarding its transmission speed based on both the restrictive information and a result of the monitoring.

7. The mobile device of claim 6, wherein
the restrictive information obtaining module is configured to obtain the restrictive information via one of the plurality of available wireless networks, and stores the restrictive information.

8. The mobile device of claim 5, wherein
the communication control module is configured to:
  select the limited wireless network as the first wireless network:
  control the wireless communicating unit to transmit via the limited wireless network when the limited wireless network is restricted regarding its transmission speed; and
  control the wireless communicating unit to transmit via the limited wireless network when the limited wireless network is not restricted regarding its transmission speed and there is the acknowledgement by the user about the transmitting of the data via the limited wireless network.

9. The mobile device of claim 8, wherein
the communicative condition prioritizes at least one of the security, the communication charges, and the utilizable area to connect to networks;
the communication control module selects a second wireless network when the limited wireless network is restricted and there is the acknowledgement by the user to change to the transmission speed.

10. The mobile device of claim 5, wherein
the communication control module is configured to select a second wireless network when the first wireless network is restricted regarding its transmission speed and there is the acknowledgement by the user about a change from the first wireless network.

11. The mobile device of claim 5, wherein
the limited wireless network is selected as the first wireless network; and
the communication control module is configured to relax the restrictive condition when the limited wireless network is restricted regarding its transmission speed and there is the acknowledgement by the user about the relaxation of the restrictive condition.

12. The mobile device of claim 1, wherein
the communication control module is configured to interrupt the data transmission when the first wireless network becomes disconnected, and
restart transmitting when the first wireless network is reconnected.

13. The mobile device of claim 1, wherein
the communication control module is configured to select a second wireless network from the plurality of available wireless networks when the first wireless network becomes disconnected.

14. The mobile device of claim 1, wherein
the communication control module is configured to select a second wireless network from the plurality of available wireless networks when the first wireless network becomes disconnected and there is the acknowledgement by the user about a change from the first wireless network.

15. The mobile device of claim 14, further comprising:
a display unit, wherein
the communication control module is configured to make the display unit display an area that is accessible to one of the plurality of available wireless networks on a map.

16. The mobile device of claim 14, wherein
the communication control module is configured to notify the user when the mobile device moves to an area that is accessible to one of the plurality of available wireless networks.

17. The mobile device of claim 1, further comprising:
a display unit, wherein
the communication control module is configured to:
  obtain location information with respect to the mobile device;
  obtain place information that indicates an area that is accessible to one of the plurality of available wireless networks based on the location information; and
  instruct the display unit to display the place information.

18. The mobile device of claim 1, further comprising:
a display unit, wherein
the communication control module is configured to:
  obtain location information with respect to the mobile device and destination information;
  search a route based on the location information and the destination information; and
  instruct the display unit to display the route as a result of the searching.

19. A mobile device, comprising:
a control unit configured to control sending of data via a first wireless network or a second wireless network that is of a different type than the first wireless network; wherein
the control unit determines if a transmission speed of the first wireless network is restricted or not restricted;
the control unit is configured to send the data via the first wireless network whose transmission speed is not restricted after receiving an acknowledgement of use for the first wireless network from a user when communication volume in the first wireless network during a set period is less than a reference volume; and
the control unit is configured to send the data via the first wireless network whose transmission speed is restricted to a slower transmission speed without receiving the acknowledgement of the use for the first wireless network from the user when the communication volume in the first wireless network during the set period is greater than the reference volume.

20. The mobile device of claim 19, wherein
the acknowledgement is made with a request screen for sending the data.

21. The mobile device of claim 19, wherein
communication charges are sent from the user to the mobile device, wherein
the communication charges are calculated based on a size of the data to send when the transmission speed has not been restricted.

22. The mobile device of claim 21, wherein
the communication charges are displayed on a screen along with the cumulative communication volume and a transmission ceiling.

23. An information processing system, comprising:
a mobile device configured to wirelessly send data;
an information processing device configured to receive and process the data from the mobile device; wherein
the mobile device, comprises:
- a wireless communicating unit configured to communicate via a plurality of kinds of wireless networks;
- an input unit configured to receive an order for ranking and prioritizing one or more communicative conditions; and
- a communication control module configured to select a first available wireless network from the plurality of kinds of wireless networks based on the prioritization and ranking, and to control the wireless communicating unit so as to transmit the data via the first wireless network; wherein the communication control module determines if a transmission speed of the first wireless network is restricted or not restricted;
the communication control module requires an acknowledgement of use for the first wireless network from a user if the transmission speed is not restricted in order to send the data via the first network; and
the communication control module does not require the acknowledgement of the use for the first wireless network from the user if the transmission speed is restricted in order to send the data via the first network, wherein
the communication control module selects the first wireless network after receiving the acknowledgement when the transmission speed is not restricted; and
the communication control module determines that the transmission speed is restricted to a slower transmission speed if accumulated communication volume for a set period is greater than a reference volume.

24. The information processing system of claim 23, wherein
the order includes communication charges; and
the communication charges are calculated based on a size of the data to send when the transmission speed has not been restricted.

25. The information processing system of claim 23, wherein
the order includes communication charges, and
the communication charges are displayed on a screen along with the cumulative communication volume and a transmission ceiling.

* * * * *